United States Patent
Della Bella et al.

[15] 3,691,229
[45] Sept. 12, 1972

[54] PROCESS FOR THE PREPARATION OF THIAMPHENICOL GLYCINATE ACETYLCYSTEINATE

[72] Inventors: Davide Della Bella, Milan; Mario Portelli, Vicenza; Giorgio Renzi, Bresso, all of Italy

[73] Assignee: Zambon S.p.A., Bresso, Milan, Italy

[22] Filed: June 8, 1970

[21] Appl. No.: 44,614

[30] Foreign Application Priority Data

June 7, 1969 Italy.....................17866 A/69

[52] U.S. Cl..............................260/481 R, 424/311
[51] Int. Cl..............................................C07c 149/20
[58] Field of Search............260/481 C, 482 R, 481 R

[56] References Cited

UNITED STATES PATENTS 3,542,854   11/1970   Teotino.....................260/482

*Primary Examiner*—Lorraine A. Weinberger
*Assistant Examiner*—John F. Terapane
*Attorney*—Stevens, Davis, Miller & Mosher

[57] ABSTRACT

A process for the preparation of thiamphenicol glycinate acetyl-cysteinate with the formula:

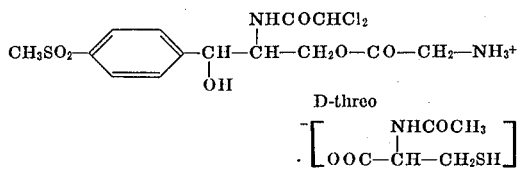

(I)

in which thiamphenicol glycinate hydrochloride is made to react with a stoichiometric quantity of dicyclohexylamine in dimethylformamide, the stoichiometric quantity of acetylcysteine is added to the solution filtered from the precipitated dicyclohexylammonium hydrochloride and the thiamphenicol glycinate acetylcysteinate formed is separated by precipitation with a precipitation agent selected from the group consisting of chloroform and ethyl ether.

1 Claim, No Drawings

PROCESS FOR THE PREPARATION OF THIAMPHENICOL GLYCINATE ACETYLCYSTEINATE

The present invention relates to a new process for the preparation of D(+)threo-1-(p-methylsulphonylphenyl)-2-dichloroacetamide-3-aminoacetoxy-1-propanol acetylcysteinate (thiamphenicol glycinate acetylcysteinate), with the formula:

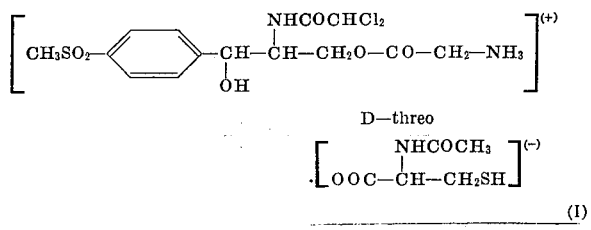

(I)

As it is known, (see British Pat No. 1,064,970), thiamphenicol glycinate acetylcysteinate is a therapeutic compound of great use in all those cases in which the infective processes are accompanied by viscous secretions in that it combines in itself the strong mucolyctic action of acetylcysteine and the antibacterial activity of thiamphenicol glycinate. Surprisingly, the antibacterial activity is greater by 20 to 50 percent than that of thiamphenicol glycinate, according to the stock treated.

According to the known process, thiamphenicol glycinate acetylcysteinate is prepared by reacting thiamphenicol glycinate with acetylcysteine in an organic solvent, preferably methyl alcohol, and drying the solution.

In practice, and in particular when passing to industrial production, this process results in difficult attainment because of the limited stability of thiamphenicol glycinate which makes its conservation and manipulation difficult.

It was thus immediately evident that instead of using thiamphenicol glycinate it would have been very convenient to use one of its stable acid addition salts.

However tests conducted in this direction, seeking to make thiamphenicol glycinate hydrochloride react with acetylcysteine according to the usual method in an organic solvent and in presence of a tertiary base such as pyridine, trimethylamine, etc. have given completely negative or unsatisfactory results from the point of view of the yield.

The object of the present invention is a process which permits thiamphenicol glycinate acetylcysteinate to be obtained industrially with high yields. The process consists essentially of making thiamphenicol glycinate hydrochloride react with dicyclohexylamine in a suitable solvent, eliminating by filtration the dicyclohexylammonium hydrochloride precipitated and reacting the thiamphenicol glycinate in a solution thus obtained with acetylcysteine.

The thiamphenicol glycinate acetylcysteinate is precipitated from the solution which contains it by mixing with a precipitation solvent.

Suitable solvents for making the reaction between thaimphenicol glycinate hydrochloride and dicyclohexylamine take place are those capable of carrying in solution the thiamphenicol glycinate hydrochloride, dicyclohexylamine, acetylcysteine and thiamphenicol glycinate acetyl-cysteinate, but have a practically zero or minimum solvent power for dicyclohexylammonium hydrochloride. We have found that a solvent which satisfied all these critical requisites from the point of view of being able to carry out the process is dimethylformamide. We have also found that by working in dimethylformamide as solvent, chloroform and ethyl ether are suitable precipitation agents. The precipitation of the final product takes place more rapidly and completely by cooling the mixture to 0° C or even lower temperatures.

The dicyclohexylamine is easily recovered by decomposition of the dicyclohexylammonium hydrochloride and recycled. The yields are always between 80 and 90 percent.

Thiamphenicol glycinate acetylcysteinate can be used either in aerosol form or by parenteral administration.

An example will now be given of the practical attainment of the process according to the present invention with the object of illustrating it without limiting the same.

EXAMPLE

To a solution of 2 kg (4.45 moles) of D(+)threo-1-(p.methylsulphonyl phenyl)-2-dichloroacetamide-3-aminoacetoxy-1-propanol hydrochloride, dissolved in 8 liters of dimethylformamide, 0.805 Kg (4.45 moles) of dicyclohexylamine are added with mixing.

After 30 minutes of mixing, the precipitated dicyclohexylammonium chlorohydrate is filtered and washed with 2 liters of dimethylformamide. To the dimethylformamidic solution thus obtained, 0.726 Kg (4.45 moles) of acetylcysteine are added with mixing, and when completely dissolved, 28 liters of chloroform are added. The mixture is cooled to 0° C and the precipitate filtered, which after washing with absolute ethyl alcohol is dried.

2.1 Kg of D(+)threo-1-(p.methylsulphonyl phenyl)-2-dichloroacetamide-3-aminoacetoxy-1-propanol acetylcysteinate are obtained, equal to a yield of 82 percent.

M.P. = 158°/159°C (dec.); $[\alpha]_D^{21.5}$ = +15.3° (c 1.5 percent in H$_2$O)

Analysis:
Percent calc = N 7.29 ; Cl 12.3 ; S 11.12
Percent found = 7.19 ; 12.3 ; 11.09

What we claim is
1. A process for the preparation of thiamphenicol glycinate acetylcysteinate of the formula:

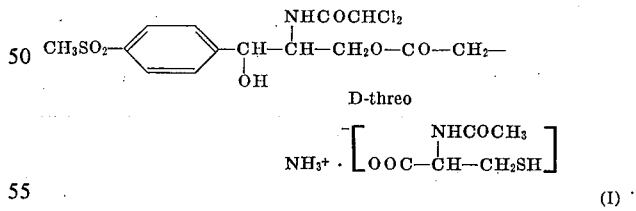

(I)

comprising reacting thiamphenicol glycinate hydrochloride with a stoichiometric quantity of dicyclohexylamine in dimethylformamide, adding the stoichiometric quantity of acetylcysteine to the solution filtered from the precipitated dicyclohexylammonium chloride, and separating by precipitation the thus formed thiamphenicol glycinate acetylcysteinate by precipitation with a precipitating agent selected from the group consisting of chloroform and ethyl ether.

* * * * *